US007930695B2

(12) United States Patent
Chaudhry et al.

(10) Patent No.: US 7,930,695 B2
(45) Date of Patent: Apr. 19, 2011

(54) METHOD AND APPARATUS FOR SYNCHRONIZING THREADS ON A PROCESSOR THAT SUPPORTS TRANSACTIONAL MEMORY

(75) Inventors: Shailender Chaudhry, San Francisco, CA (US); Marc Tremblay, Menlo Park, CA (US); Paul Caprioli, Mountain View, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1384 days.

(21) Appl. No.: 11/418,652

(22) Filed: May 5, 2006

(65) Prior Publication Data
US 2007/0240158 A1    Oct. 11, 2007

Related U.S. Application Data

(60) Provisional application No. 60/789,804, filed on Apr. 6, 2006.

(51) Int. Cl.
*G06F 9/46* (2006.01)
(52) U.S. Cl. .......................... 718/100; 718/102; 711/137
(58) Field of Classification Search .................. 718/100, 718/102; 711/137, 163
See application file for complete search history.

(56) References Cited

U.S. PATENT DOCUMENTS

| 5,428,761 | A | 6/1995 | Herlihy et al. | 711/130 |
|---|---|---|---|---|
| 5,701,432 | A | 12/1997 | Wong et al. | 711/130 |
| 5,742,785 | A | 4/1998 | Stone et al. | 712/217 |
| 5,835,764 | A | 11/1998 | Platt et al. | 718/101 |
| 5,940,827 | A | 8/1999 | Hapner et al. | 707/8 |
| 5,974,438 | A | 10/1999 | Neufeld | 718/104 |
| 6,021,480 | A | 2/2000 | Pettey | 711/201 |
| 6,185,577 | B1 | 2/2001 | Nainani et al. | |
| 6,360,220 | B1 | 3/2002 | Forin | 707/8 |
| 6,460,124 | B1 | 10/2002 | Kagi et al. | 711/163 |

(Continued)

OTHER PUBLICATIONS

Publication entitled "Speculation-Based Techniques for Transactional Lock-Free Execution of Lock-Based Programs", by Ravi Rajwar, Online! 2002, XP002286237, Retrieved from the internet: URL:http://bbcr.uwaterloo.ca/{brecht/courses/856/readings-new/rajwar02speculationsbased.pdf.

(Continued)

*Primary Examiner* — Diem K Cao
(74) *Attorney, Agent, or Firm* — Park, Vaughan, Fleming & Dowler LLP (57) ABSTRACT

One embodiment of the present invention provides a system that synchronizes threads on a multi-threaded processor. The system starts by executing instructions from a multi-threaded program using a first thread and a second thread. When the first thread reaches a predetermined location in the multi-threaded program, the first thread executes a Start-Transactional-Execution (STE) instruction to commence transactional execution, wherein the STE instruction specifies a location to branch to if transactional execution fails. During the subsequent transactional execution, the first thread accesses a mailbox location in memory (which is also accessible by the second thread) and then executes instructions that cause the first thread to wait. When the second thread reaches a second predetermined location in the multi-threaded program, the second thread signals the first thread by accessing the mailbox location, which causes the transactional execution of the first thread to fail, thereby causing the first thread to resume non-transactional execution from the location specified in the STE instruction. In this way, the second thread can signal to the first thread without the first thread having to poll a shared variable.

21 Claims, 8 Drawing Sheets

U.S. PATENT DOCUMENTS

| | | | |
|---|---|---|---|
| 6,578,088 B2 | 6/2003 | Singhal et al. | 707/8 |
| 6,681,311 B2 | 1/2004 | Gaskins et al. | 711/203 |
| 6,862,664 B2 * | 3/2005 | Tremblay et al. | 711/137 |
| 6,918,012 B2 | 7/2005 | Venkitakrishnan et al. | 711/150 |
| 6,941,449 B2 | 9/2005 | Ross | 712/35 |
| 2002/0087810 A1 | 7/2002 | Boatright et al. | 711/145 |
| 2002/0178349 A1 | 11/2002 | Shibayama et al. | 712/235 |
| 2003/0066056 A1 | 4/2003 | Petersen et al. | 717/137 |
| 2003/0079094 A1 | 4/2003 | Rajwar et al. | 711/150 |
| 2004/0162948 A1 | 8/2004 | Tremblay et al. | 711/137 |
| 2004/0186970 A1 | 9/2004 | Kekre et al. | 711/62 |
| 2007/0143755 A1 * | 6/2007 | Sahu et al. | 718/100 |

OTHER PUBLICATIONS

Publication entitled "Checkpoint Processing and Recovery: Towards Scalable Large Instruction Window Processors", by Haitham Akkary et al., Proceedings of the 36th International Symposium on Microarchitecture, 2003, IEEE.

Publication entitled "Multiple Reservations and the Oklahoma Update", by Janice M. Stone et al., IEEE Parallel & Distributed Technology, Nov. 1993, pp. 58-71.

Publication entitled "Improving the Throughput of Synchronization by Insertion of Delays", by Ravi Rajwar et al. Proceedings of the Sixth International Symposium on High-Performance Computer Architecture, Jan. 8-12, 2000, pp. 168-179.

Publication entitled "Checkpoint Processing and Recovery: An Efficient, Scalable Alternative to Reorder Buffers" Haitham Akkary et al. IEEE Computer Society, Nov.-Dec. 2003, pp. 11-19.

Publication entitled "Multi-view Memory to Support OS Locking for Transaction Systems", P. Bodorik et al., IEEE, 1997, pp. 309-318.

Publication entitled "Indexing for Multiversion Locking: Alternatives and Performance Evaluation", Paul M. Bober et al, IEEE Transactions on Knowledge and Data Engineering, vol. 9, No. 1, Jan.-Feb. 1997, pp. 68-84.

Publication entitled: "Transactional Execution: Toward Reliable, High-Performance Multithreading" by Ravi Rajwar et al. IEEE Computer Society, Nov.-Dec. 2003, pp. 117-125.

Publication: "Speculative Lock Elision: Enabling Highly Concurrent Multithreaded Execution" by Ravi Rajwar and James R. Goodman, Computer Sciences Department, University of Wisconsin-Madison, Madison, WI 53706 USA, rajwar@cs.wisc.edu, XP-001075852, published in IEEE Journal Jan. 12, 2001, pp. 294-305.

"Structured Computer Organization" by Andrew S. Tanenbaum, Published 1999, pp. 5, 7-8.

"The Transaction Concept: Virtues and Limitations" by Jim Gray. Pro. Int'l Conf. Very Large Databases, Morgan Kaufman, 1981. pp. 144-154.

"Toward Efficient and Robust Software Speculative Parallelization on Multiprocessors" by Marcelo Cintra and Diego R. Lianos, PPoPP' 03 Jun. 11-13, 2003 ACM 1-58113-588-2/03/0006 pp. 13-24.

"Microsoft Computer Dictionary" Fifth Edition, pub 2002, p. 378.

Publication: "Speculative Synchronization: Applying Thread-Level Speculation to Explicitly Parallel Applications" by Jose F. Martinez and Josep Torrellas, Dept. of Computer Science, University of Illinois at Urbana-Champaign, Urbana, IL 61801 USA, http://iacoma.cs.uiuc.edu, XP-002285169, published in ASPLOS X, Oct. 2002, pp. 18-29.

Publication: "Transactional Memory: Architectural Support for Lock-Free Data Structures" by Maurice Herlihy, Digital Equip. Corp. Cambridge Research Laboratory, Cambridge, MA 02139, herlihy@crl.dec.com and J. Eliot B. Moss, Dept. of Computer Science, University of Massachusetts, Amherst, MA 01003, moss@cs.umass.edu, XP-000380375, published in Computer Architecture News, May 21, 1993, pp. 289-300.

Publication: "Enhancing Software Reliability with Speculative Threads" by Jeffrey Oplinger and Monica S. Lam, Computer Systems, Laboratory, Stanford University, jeffop@stanford.edu, XP-002285168 published in SPLOS X, 10-2202, pp. 184-196.

* cited by examiner

FIG. 1

OLD VERSION    NEW VERSION

⋮              ⋮

ACQUIRE LOCK   STE      <FAIL PC>

⋮              ⋮

CRITICAL    CRITICAL
SECTION        SECTION

⋮              ⋮

RELEASE LOCK   COMMIT

METHOD AND APPARATUS FOR SYNCHRONIZING THREADS ON A PROCESSOR THAT SUPPORTS TRANSACTIONAL MEMORY

RELATED APPLICATION

This application claims priority under 35 U.S.C. section 119(e) to U.S. Provisional Application Ser. No. 60/789,804, entitled "Method and Apparatus for Synchronizing Threads on a Processor that Supports Transactional Memory," by inventors Shailender Chaudhry, Marc Tremblay, and Paul Caprioli, filed on 6 Apr. 2006, the contents of which are herein incorporated by reference. This application is also related to a non-provisional U.S. patent application entitled, "Start Transactional Execution (STE) Instruction to Support Transactional Program Execution," by inventors Marc Tremblay, Quinn A. Jacobson and Shailender Chaudhry, U.S. patent application Ser. No. 10/637,166, filed on 8 Aug. 2003.

BACKGROUND

1. Field of the Invention

The present invention relates to techniques for improving the performance of computer systems. More specifically, the present invention relates to a method and apparatus for synchronizing threads on a processor that supports transactional memory.

2. Related Art

Computer system designers have developed mechanisms to support multi-threading within the latest generation of Chip-Multiprocessors (CMPs) as well as more traditional Shared Memory Multiprocessors (SMPs). With proper hardware support, multi-threading can dramatically increase the performance of applications. However, as microprocessor performance continues to increase, the time spent synchronizing threads is becoming a large fraction of overall execution time. In fact, as multi-threaded applications begin to use even more threads, this synchronization overhead is becoming a dominant factor in limiting application performance.

One of the most common synchronization schemes requires the threads to be synchronized at certain points during the execution of code for a program. In other words, a programmer or compiler determines a synchronization point in each thread's code where the thread halts and waits for the other threads on the processor to reach their respective synchronization points.

For example, upon reaching the synchronization point, each thread can set some type of an indicator and then halt. After halting, each thread polls the indicators corresponding to the other related threads. When a given thread determines that the other related threads have reached their respective synchronization point, the given thread resumes executing.

Unfortunately, the process of polling the indicators associated with the other threads consumes processor resources, which can reduce the amount of useful work done by the processor.

Hence, what is needed is a processor that supports synchronization between multiple threads without the above-described problem.

SUMMARY

One embodiment of the present invention provides a system that synchronizes threads on a multi-threaded processor. The system starts by executing instructions from a multi-threaded program using a first thread and a second thread. When the first thread reaches a predetermined location in the multi-threaded program, the first thread executes a Start-Transactional-Execution (STE) instruction to commence transactional execution, wherein the STE instruction specifies a location to branch to if transactional execution fails. During the subsequent transactional execution, the first thread accesses a mailbox location in memory (which is also accessible by the second thread) and then executes instructions that cause the first thread to wait. When the second thread reaches a second predetermined location in the multi-threaded program, the second thread signals the first thread by accessing the mailbox location, which causes the transactional execution of the first thread to fail, thereby causing the first thread to resume non-transactional execution from the location specified in the STE instruction. In this way, the second thread can signal to the first thread without the first thread having to poll a shared variable.

In a variation of this embodiment, commencing transactional execution involves checkpointing the state of the first thread, configuring the processor to load-mark cache lines during loads that take place during transactional execution, configuring the processor to store-mark cache lines during stores that take place during transactional execution, and configuring the processor to continually monitor data references from other threads to detect interfering data references.

In a variation of this embodiment, accessing the mailbox location involves storing a value to the mailbox location, or loading a value from the mailbox location.

In a variation of this embodiment, the second thread signals the first thread by accessing the mailbox location. This can involve either (1) storing to the mailbox location wherein the mailbox location was previously load-marked by the first thread, or (2) loading or storing to the mailbox location wherein the mailbox location was previously store-marked by the first thread.

In a variation of this embodiment, the system uses multiple mailbox locations to signal between three or more threads.

In a variation of this embodiment, causing the first thread to wait involves repeatedly executing a delay loop.

In a variation of this embodiment, causing the first thread to wait involves causing the first thread to not perform computational operations.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Computer System

Figure 1:
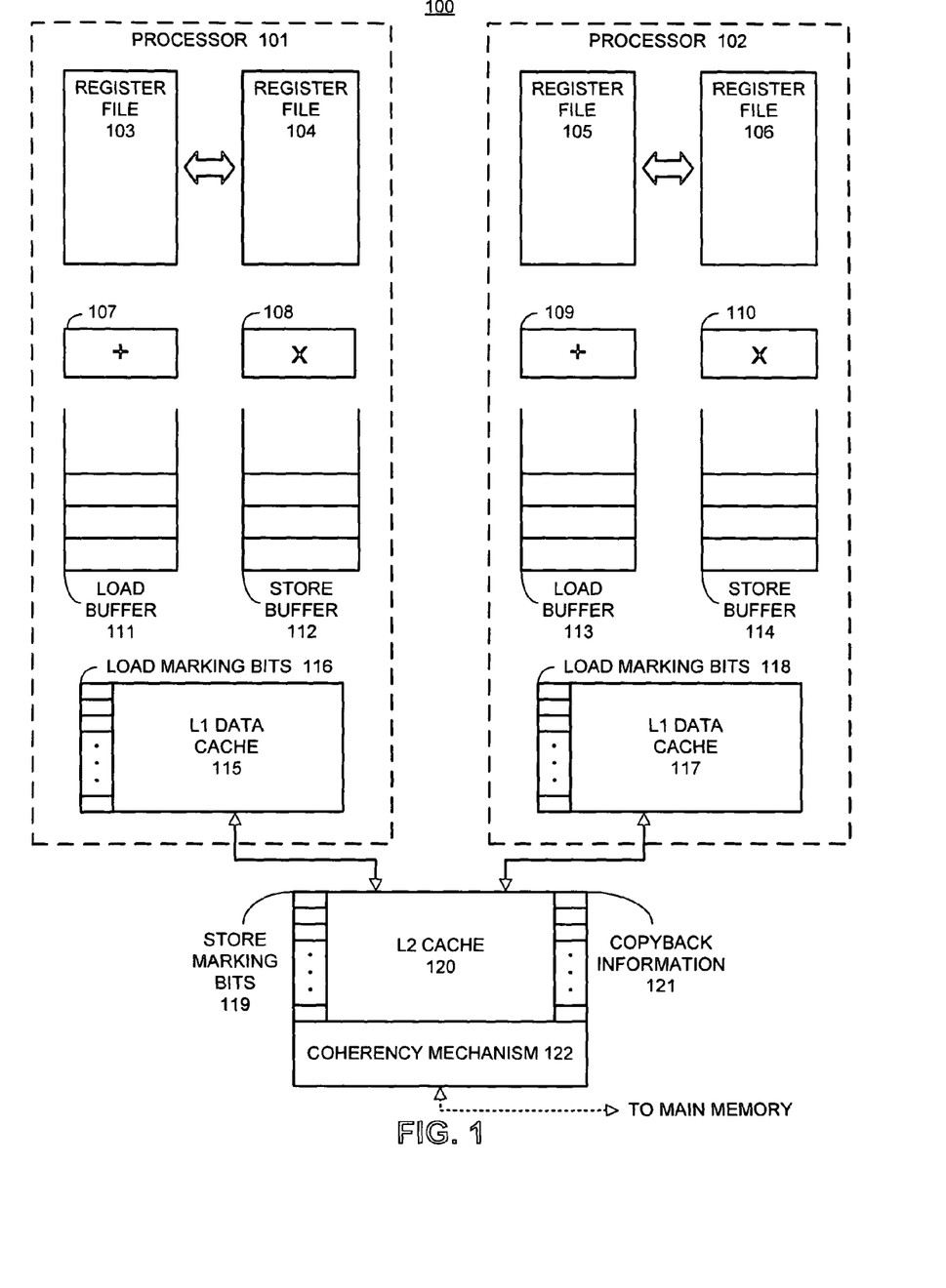
FIG. 1 illustrates a computer system in accordance with an embodiment of the present invention.

FIG. 1 illustrates a computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance. As is illustrated in FIG. 1, computer system 100 includes processors 101 and level 2 (L2) cache 120, which is coupled to main memory (not shown). Processor 102 is similar in structure to processor 101, so only processor 101 is described below.

Processor 101 has two register files 103 and 104, one of which is an "active register file" and the other of which is a backup "shadow register file." In one embodiment of the present invention, processor 101 provides a flash copy operation that instantly copies all of the values from register file 103 into register file 104. This facilitates a rapid register checkpointing operation to support transactional execution. In another embodiment, a 1-bit pointer maintains which register is considered active and which is backup.

Processor 101 also includes one or more functional units, such as adder 107 and multiplier 108. These functional units are used in performing computational operations involving operands retrieved from register files 103 or 104. As in a conventional processor, load and store operations pass through load buffer 111 and store buffer 112.

Processor 101 additionally includes a level one (L1) data cache 115, which stores data items that are likely to be used by processor 101. Note that each line in L1 data cache 115 includes a "load-marking bit," which indicates that a data value from the line has been loaded during transactional execution. This load-marking bit is used to determine whether any interfering memory references take place during transactional execution as is described below with reference to FIGS. 3-8. Processor 101 also includes an L1 instruction cache (not shown).

Note that load-marking does not necessarily have to take place in L1 data cache 115. In general load-marking can take place at any level cache, such as L2 cache 120. However, for performance reasons, the load-marking takes place at the cache level that is closest the processor as possible, which in this case is L1 data cache 115. Otherwise, loads would have to go to L2 cache 120 even on an L1 hit.

L2 cache 120 operates in concert with L1 data cache 115 (and a corresponding L1 instruction cache) in processor 101, and with L1 data cache 117 (and a corresponding L1 instruction cache) in processor 102. Note that L2 cache 120 is associated with a coherency mechanism 122, such as the reverse directory structure described in U.S. patent application Ser. No. 10/186,118, entitled, "Method and Apparatus for Facilitating Speculative Loads in a Multiprocessor System," filed on Jun. 26, 2002, by inventors Shailender Chaudhry and Marc Tremblay (Publication No. US-2002-0199066-A1). This coherency mechanism 122 maintains "copyback information" 121 for each cache line. This copyback information 121 facilitates sending a cache line from L2 cache 120 to a requesting processor in cases where the current version of the cache line must first be retrieved from another processor.

Each line in L2 cache 120 includes a "store-marking bit," which indicates that a data value has been stored to the line during transactional execution. This store-marking bit is used to determine whether any interfering memory references take place during transactional execution as is described below with reference to FIGS. 3-8. Note that store-marking does not necessarily have to take place in L2 cache 120.

Ideally, the store-marking takes place in the cache level closest to the processor where cache lines are coherent. For write-through L1 data caches, writes are automatically propagated to L2 cache 120. However, if an L1 data cache is a write-back cache, we perform store-marking in the L1 data cache. (Note that the cache coherence protocol ensures that any other processor that subsequently modifies the same cache line will retrieve the cache line from the L1 cache, and will hence become aware of the store-mark.)

Executing a Critical Section

Figure 2:
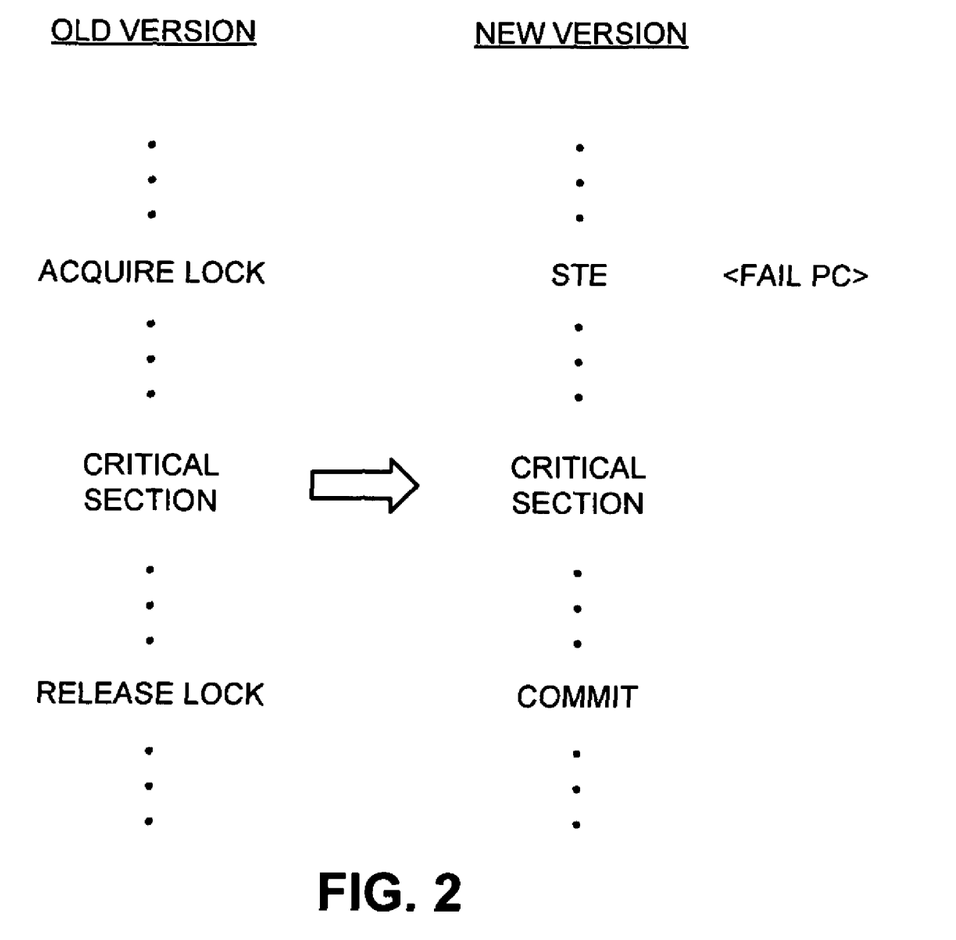
FIG. 2 illustrates how a critical section is executed in accordance with an embodiment of the present invention.

Transactional execution is typically used to execute critical sections of code without the overhead of acquiring locks, For example, FIG. 2 illustrates how a critical section can be executed in accordance with an embodiment of the present invention. As is illustrated in the left-hand side of FIG. 2, a process that executes a critical section typically acquires a lock associated with the critical section before entering the critical section. If the lock has been acquired by another process, the process may have to wait until the other process releases the lock. Upon leaving the critical section, the process releases the lock. (Note that the terms "thread" and "process" is used interchangeably throughout this specification.)

A lock can be associated with a shared data structure. For example, before accessing a shared data structure, a process can acquire a lock on the shared data structure. The process can then execute a critical section of code that accesses the shared data structure. After the process is finished accessing the shared data structure, the process releases the lock.

In contrast, in the present invention, the process does not acquire a lock, but instead executes a start transactional execution (STE) instruction before entering the critical section. If the critical section is successfully completed without interference from other processes, the process performs a commit operation, to commit changes made during transactional execution. This sequence of events is described in more detail below with reference to FIGS. 3-8.

Note that in one embodiment of the present invention a compiler replaces lock-acquiring instructions with STE instructions, and also replaces corresponding lock releasing instructions with commit instructions. (Note that there may not be a one-to-one correspondence between replaced instructions. For example, a single lock acquisition operation comprised of multiple instructions may be replaced by a single STE instruction.) The above discussion presumes that the processor's instruction set has been augmented to include an STE instruction and a commit instruction. These instructions are described in more detail below with reference to FIGS. 3-9.

Transactional Execution Process

Figure 3:
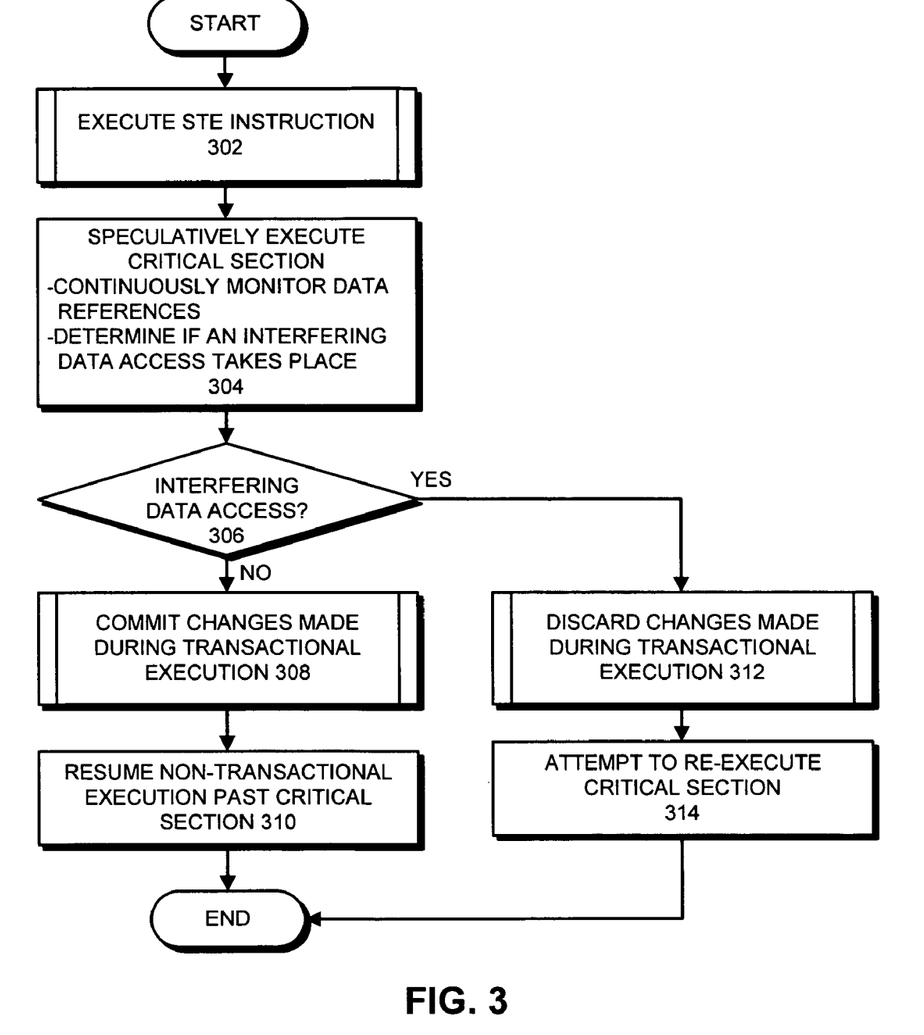
FIG. 3 presents a flow chart illustrating the transactional execution process in accordance with an embodiment of the present invention.

FIG. 3 presents a flow chart illustrating how transactional execution can take place in accordance with an embodiment of the present invention. A process first executes an STE instruction prior to entering a critical section of code (step 302). Next, the system transactionally executes code within the critical section, without committing results of the transactional execution (step 304).

During this transactional execution, the system continually monitors data references made by other processes, and determines if an interfering data access (or other type of failure) takes place during transactional execution (step 306). If not, the system atomically commits all changes made during transactional execution (step 308) and then resumes normal non-transactional execution of the program past the critical section (step 310).

On the other hand, if an interfering data access is detected, the system discards changes made during the transactional execution (step 312), and attempts to re-execute the critical section (step 314).

In one embodiment of the present invention, the system attempts the transactionally re-execute the critical section zero, one, two or more times. If these attempts are not successful, the system reverts back to the conventional technique of acquiring a lock on the critical section before entering the critical section, and then releasing the lock after leaving the critical section.

Note that an interfering data access can include a store by another process to a cache line that has been load-marked by the process. It can also include a load or a store by another process to a cache line that has been store-marked by the process.

Also note that circuitry to detect interfering data accesses can be easily implemented by making minor modifications to conventional cache coherence circuitry. This conventional cache coherence circuitry presently generates signals indicating whether a given cache line has been accessed by another processor. Hence, these signals can be used to determine whether an interfering data access has taken place.

Starting Transactional Execution

Figure 4:
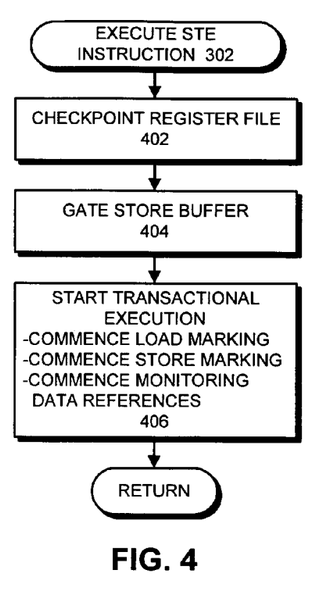
FIG. 4 presents a flow chart illustrating a start transactional execution (STE) operation in accordance with an embodiment of the present invention.

FIG. 4 presents a flow chart illustrating a start transactional execution (STE) operation in accordance with an embodiment of the present invention. This flow chart illustrates what takes place during step 302 of the flow chart in FIG. 3. The system starts by checkpointing the register file (step 402). This can involve performing a flash copy operation from register file 103 to register file 104 (see FIG. 1). In addition to checkpointing register values, this flash copy can also checkpoint various state registers associated with the currently executing process. In general, the flash copy operation checkpoints enough state to be able to restart the corresponding thread.

At the same time the register file is checkpointed, the STE operation also causes store buffer 112 to become "gated" (step 404). This allows existing entries in store buffer to propagate to the memory sub-system, but prevents new store buffer entries generated during transactional execution from doing so.

The system then starts transactional execution (step 406), which involves load-marking and store-marking cache lines, if necessary, as well as monitoring data references in order to detect interfering references.

Load-Marking Process

Figure 5:
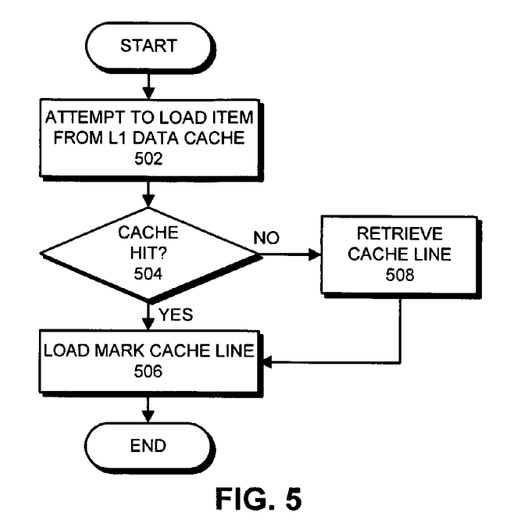
FIG. 5 presents a flow chart illustrating how load-marking is performed during transactional execution in accordance with an embodiment of the present invention.

FIG. 5 presents a flow chart illustrating how load-marking is performed during transactional execution in accordance with an embodiment of the present invention. During transactional execution of a critical section, the system performs a load operation. In performing this load operation if the load operation has been identified as a load operation that needs to be load-marked, system first attempts to load a data item from L1 data cache 115 (step 502). If the load causes a cache hit (step 504), the system "load-marks" the corresponding cache line in L1 data cache 115 (step 506). This involves setting the load-marking bit for the cache line. Otherwise, if the load causes a cache miss, the system retrieves the cache line from further levels of the memory hierarchy (step 508), and proceeds to step 506 to load-mark the cache line in L1 data cache 115.

Store-Marking Process

Figure 6:
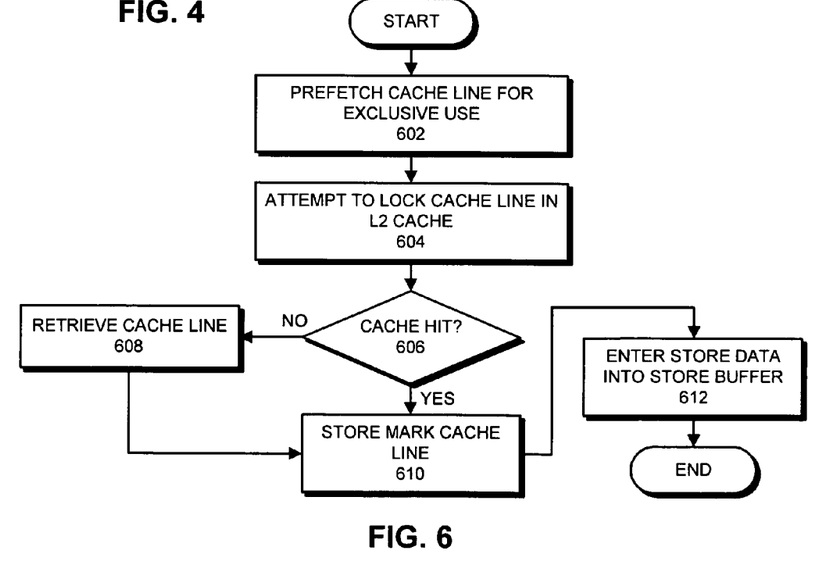
FIG. 6 presents a flow chart illustrating how store-marking is performed during transactional execution in accordance with an embodiment of the present invention.

FIG. 6 presents a flow chart illustrating how store-marking is performed during transactional execution in accordance with an embodiment of the present invention. During transactional execution of a critical section, the system performs a store operation. If this store operation has been identified as a store operation that needs to be store-marked, the system first prefetches a corresponding cache line for exclusive use (step 602). Note that this prefetch operation will do nothing if the line is already located in cache and is already in an exclusive use state.

Since in this example L1 data cache 115 is a write-through cache, the store operation propagates through L1 data cache 115 to L2 cache 120. The system then attempts to lock the cache line corresponding to the store operation in L1 data cache 115 (step 604). If the corresponding line is in L2 cache 120 (cache hit) (step 606), the system "store-marks" the corresponding cache line in L2 cache 120 (step 610). This involves setting the store-marking bit for the cache line. Otherwise, if the corresponding line is not in L2 cache 120 (cache miss), the system retrieves the cache line from further levels of the memory hierarchy (step 608) and then proceeds to step 610 to store-mark the cache line in L2 cache 120.

Next, after the cache line is store-marked in step 610, the system enters the store data into an entry of the store buffer 112 (step 612). Note that this store data will remain in store buffer 112 until a subsequent commit operation takes place, or until changes made during the transactional execution are discarded.

Note that a cache line that is store-marked by a given thread can be read by other threads. Note that this may cause the given thread to fail while the other threads continue.

Commit Operation

Figure 7:
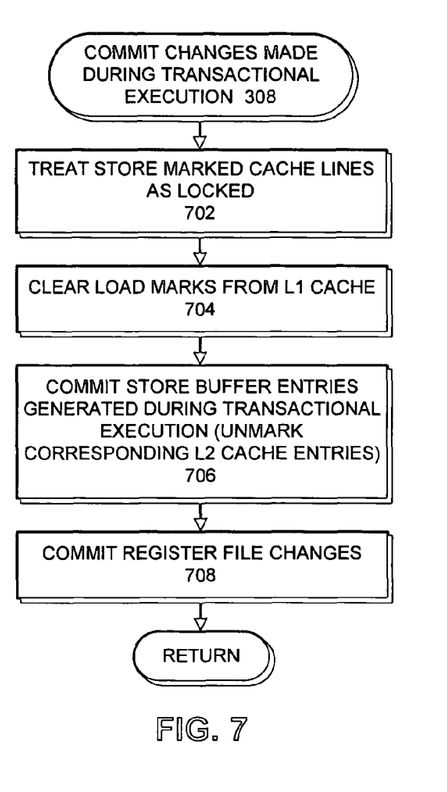
FIG. 7 presents a flow chart illustrating how a commit operation is performed in accordance with an embodiment of the present invention.

FIG. 7 presents a flow chart illustrating how a commit operation is performed after transactional execution completes successfully in accordance with an embodiment of the present invention. This flow chart illustrates what takes place during step 308 of the flow chart in FIG. 3.

The system starts by treating store-marked cache lines as though they are locked (step 702). This means other processes that request a store-marked line must wait until the line is no longer locked before they can access the line. This is similar to how lines are locked in conventional caches.

Next, the system clears load-marks from L1 data cache 115 (step 704).

The system then commits entries from store buffer 112 for stores that are identified as needing to be marked, which were generated during the transactional execution, into the memory hierarchy (step 706). As each entry is committed, a corresponding line in L2 cache 120 is unlocked.

The system also commits register file changes (step 708). For example, this can involve functionally performing a flash copy between register file 103 and register file 104 in the system illustrated in FIG. 1. Alternatively, this can involve updating the pointer to which register is seen as architecturally valid.

Discarding Changes

Figure 8:
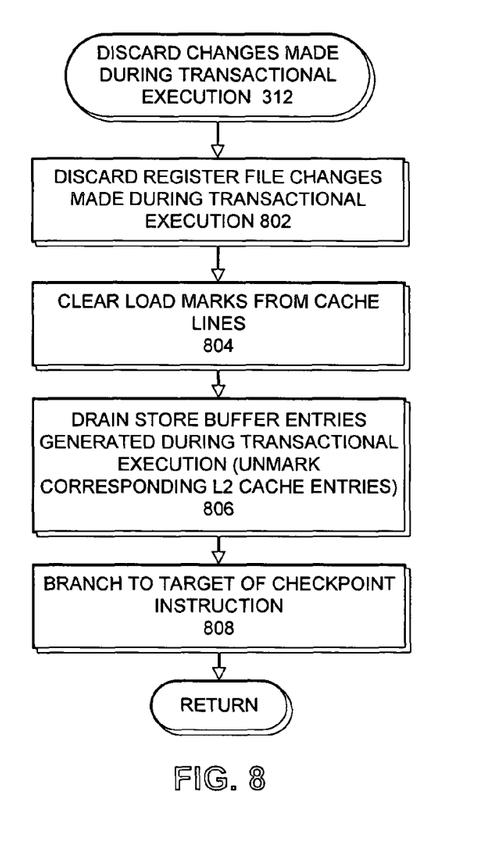
FIG. 8 presents a flow chart illustrating how changes are discarded after transactional execution completes unsuccessfully in accordance with an embodiment of the present invention.

FIG. 8 presents a flow chart illustrating how changes are discarded after transactional execution completes unsuccessfully in accordance with an embodiment of the present invention. This flow chart illustrates what takes place during step 312 of the flow chart in FIG. 3. The system first discards register file changes made during the transactional execution (step 802). This can involve either clearing or simply ignoring register file changes made during transactional execution. This is easy to accomplish because the old register values were checkpointed prior to commencing transactional execution. The system also clears load-marks from cache lines in L1 data cache 115 (step 804), and drains store buffer entries generated during transactional execution without committing them to the memory hierarchy (step 806). At the same time, the system unmarks corresponding L2 cache lines. Finally, in one embodiment of the present invention, the system branches to a target location specified by the STE instruction (step 808). The code at this target location attempts to re-execute the critical section as is described above with reference to step 314 of FIG. 1.

STE Instruction

Figure 9:
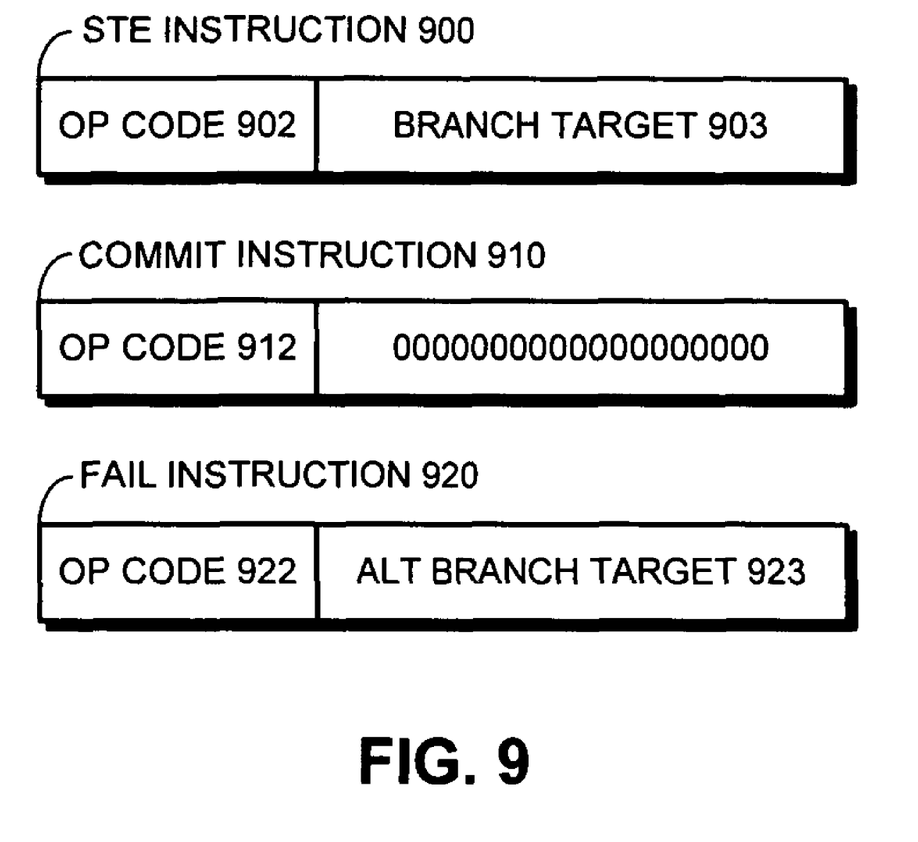
FIG. 9 illustrates instructions to support transactional execution in accordance with an embodiment of the present invention.

Referring to FIG. 9, STE instruction 900 marks the beginning of a block of instructions to be executed transactionally. When STE instruction 900 is encountered during program execution, the system commences transactional execution of the block of instruction immediately following STE instruction 900. Changes made during this transactional execution are not committed to the architectural state of the processor until the transactional execution successfully completes, at which point all of the changes are committed in one atomic operation as described above with reference to FIG. 7.

Note that STE instruction 900 includes an operation code (op code) 902, which identifies the STE instruction and a branch target 903. Branch target 903 contains a PC-relative branch target that specifies where to jump to when a failure occurs during transactional execution.

Instead of jumping to a branch target during a failure, the system can alternatively take other actions, such as automatically attempting the re-execute the block of instructions, or attempting to acquire a lock on the block of instructions and then re-executing the block of instructions. The system can also set state information within the processor to indicate a failure during transactional execution of the block of instructions. This enables other software executed by the processor to manage the failure.

STE instruction 900 is somewhat unique in that its semantics are defined by what happens after the instruction, in a following transactionally executed block of code. If a commit instruction is successfully reached, STE instruction 900 behaves as if it were a NOOP. In this case, the code in the critical section following STE instruction 900 is successfully completed, and execution resumes with the code following the commit instruction.

On the other hand, if a commit instruction is not successfully reached, the STE instruction behaves as if it were an annulling "branch always" instruction that causes a status register to be updated with a value indicating the reason for failure. In this case, no visible effect remains from the instructions in the unsuccessful critical section.

Failures can arise from a number of sources. For example, in one embodiment of the present invention, transactional execution is considered to have failed if any of the following events occur before reaching a commit instruction: (1) a fail instruction is reached; (2) an instruction not allowed in critical sections is encountered, such as FLUSH, MEMBAR, DONE, RETRY, and any write of an ASR register, privileged register or internal ASI register; (3) a trap occurs; (4) an interrupt occurs; (5) a coherent load or store operation from another processor may have caused the sequence of loads and stores within the critical section to not appear atomic to other processors; (6) the processor runs out of hardware resources to buffer store operations from the critical section; (7) the processor runs out of hardware resources to track load operations from the critical section; and (8) too many stalling operations are encountered. This can be caused, for instance, by too many operations generating cache misses.

Commit Instruction

The commit instruction 910 marks the end of a block of instructions to be executed transactionally. Commit instruction 910 is used in conjunction with STE instruction 900 to delineate a block of instructions to be transactionally executed, such as a critical section. When commit instruction 910 is encountered during execution of a program, the system completes transactional execution of the block of instruction immediately preceding the commit instruction. This involves atomically committing changes made during the transactional execution to the architectural state of the processor as is described above with reference to FIG. 7. The system also resumes normal non-transactional execution.

If a commit instruction is reached, and there was no preceding STE instruction, the commit instruction is treated as a NOOP. Alternatively, the commit instruction can be considered illegal in this case in order to facilitate debugging incorrect software.

Referring to FIG. 9, the commit instruction 910 includes an op code 912, which identifies the instruction, and no operand is required.

In a variation of the commit instruction, after committing changes made during the transactional execution, the system resumes transactional execution of instructions following the commit instruction. Hence, instead of terminating transactional execution, the system commits the changes made during transactional execution thus far and resumes transactional execution.

Fail Instruction

Fail instruction 920 terminates transactional execution without committing results of the transactional execution to the architectural state of the processor. Hence, fail instruction 920 directs the hardware to revert back to the program state at the point of the preceding STE instruction. This involves discarding changes made during transactional execution as is described above with reference to FIG. 8.

After the changes are discarded, the system can perform a number of different actions. In one embodiment of the present invention, the system branches to a branch target specified by a corresponding start transactional execution (STE) instruction. In another embodiment, the system branches to a location specified by the fail instruction itself, such as alternative branch target 923 in fail instruction 920 in FIG. 3. In yet another embodiment, the system attempts to re-execute the block of instructions.

Note that instead of immediately causing the transactional execution to fail, the fail instruction can simply set state information within the processor to indicate that a failure has occurred, and the actual failure actions can take place later, for example upon encountering a subsequent commit instruction.

If a fail instruction is reached, and there was no preceding STE instruction, the fail instruction is treated as a NOOP.

Referring to FIG. 9, the fail instruction 920 includes an op code 922, which identifies the instruction, and possibly an alternative branch target 923. Note that the fail instruction need not be assigned a unique op code. For example, since a trap instruction naturally triggers the failure of a transactional region, a conditional trap instruction (for example, the "Tcc" instruction on processors based on the SPARC™ architecture) can be used. In this way, the conditional trap instruction serves as a conditional fail instruction. Compliers or assemblers can generate identical machine code for the FAILcc instruction and the Tcc instruction.

Note that to facilitate "transactional execution" software can specify a speculative region of code, wherein selected memory accesses may be committed atomically to the architectural state of the processor as a transaction.

Synchronizing Threads Using Transactional Memory

Figure 10:
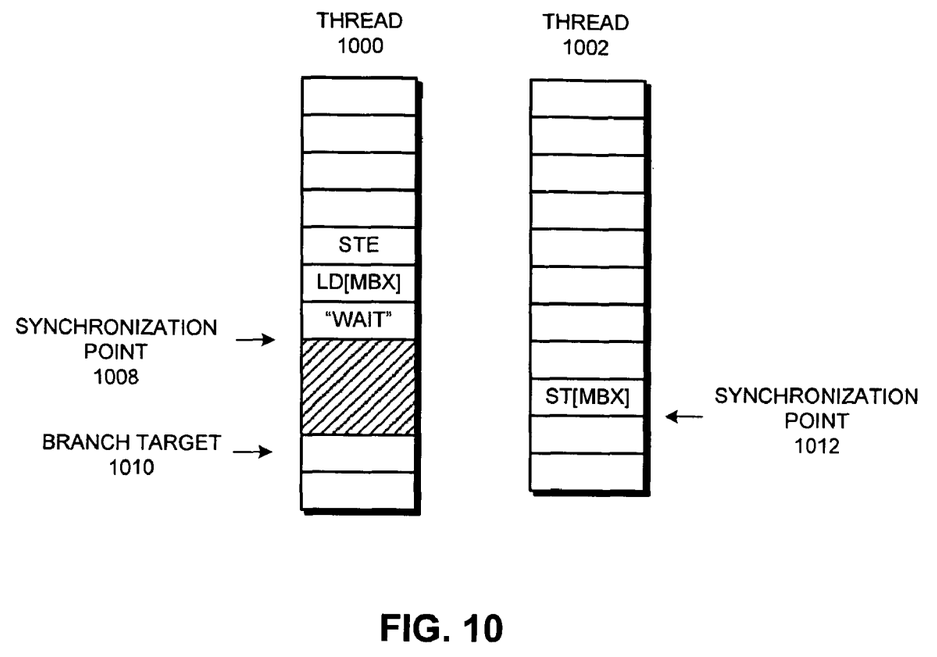
FIG. 10 illustrates exemplary synchronization instructions executed by two threads in accordance with an embodiment of the present invention.
Figure 11:
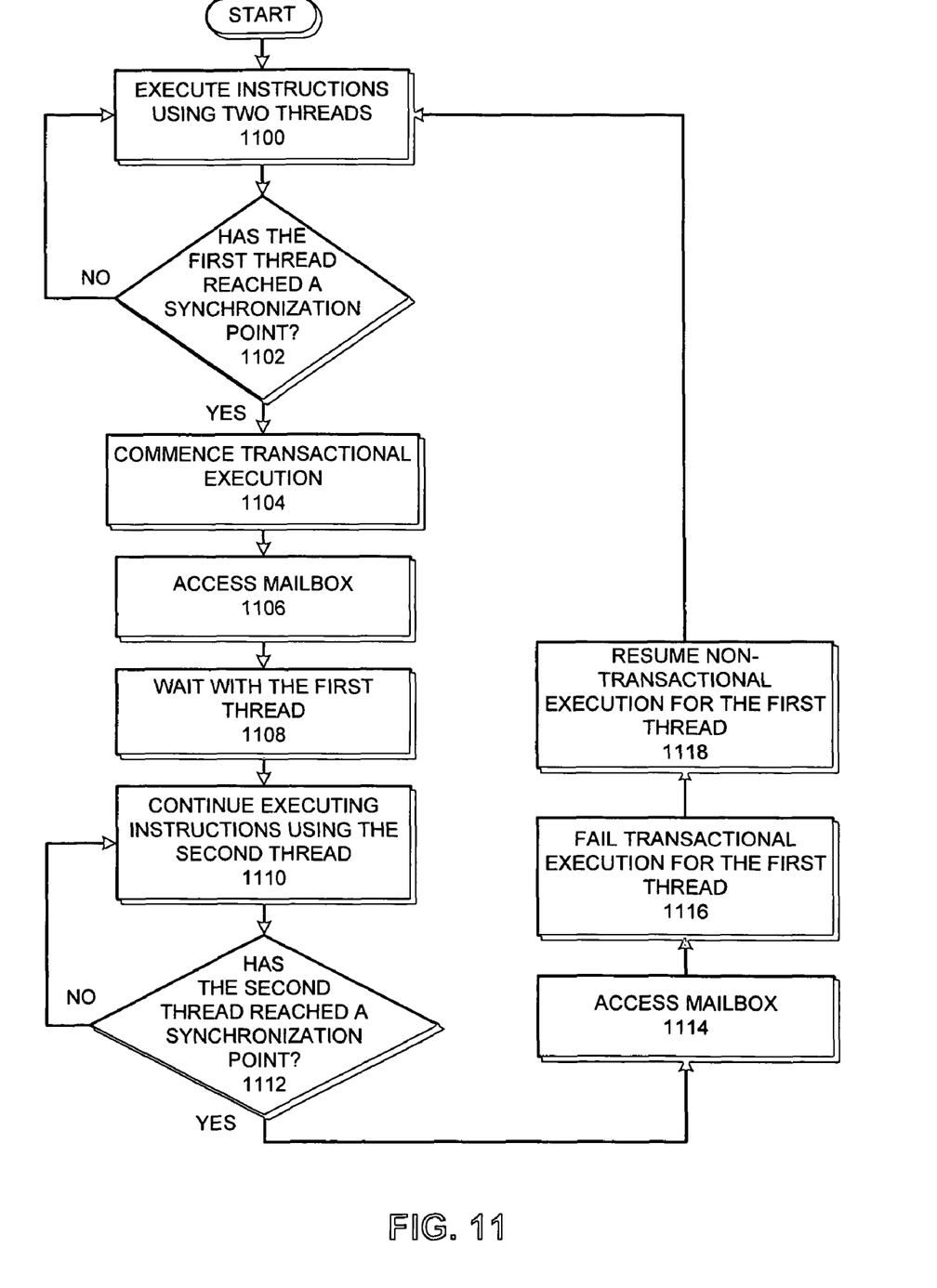
FIG. 11 presents a flowchart illustrating the process of synchronizing multiple threads in accordance with an embodiment of the present invention.

Instead of using transactional memory to execute critical sections, one embodiment of the present invention uses transactional memory to perform synchronization operations between threads. For example, FIG. 10 illustrates exemplary synchronization instructions executed by two threads in accordance with an embodiment of the present invention. The rectangles representing threads 1000 and 1002 are segmented in a series of smaller rectangles that represent individual instructions that are executed by the threads. The hash-marked rectangle (shown in thread 1000) indicates that the thread waits following a synchronization point, as described below. FIG. 11 presents a flowchart illustrating corresponding synchronization operations in accordance with an embodiment of the present invention.

The system starts with threads 1000 and 1002 executing instructions (step 1100). While executing instructions, thread 1000 encounters a series of instructions just before synchronization point 1008 (step 1102).

This series of instructions facilitates synchronizing thread 1000 with thread 1002. Thread 1000 first executes the STE instruction, which causes thread 1000 to commence transactional execution (step 1104). The STE instruction includes a PC-relative branch target 1010 that specifies where to jump to when a failure occurs during transactional execution.

Thread 1000 then executes a load instruction ("LD[MBX]") to load a value from a "mailbox" location in memory (step 1106). If the load causes a cache hit, the system "load-marks" the corresponding cache line in L1 data cache 115. This involves setting the load-marking bit for the cache line. Otherwise, if the load causes a cache miss, the system first retrieves the cache line from the memory hierarchy and then load-marks the cache line in L1 data cache 115.

Thread 1000 then "waits" (step 1108). While waiting, thread 1000 continues in transactional execution, but performs computational work at a significantly reduced rate. In one embodiment of the present invention, thread 1000 enters a short loop comprised of a delay instruction and a branch-always instruction while waiting. While in this loop, thread 1000 repeatedly executes the delay instruction. In an alternative embodiment, thread 1000 executes no instructions while waiting.

While thread 1000 is waiting, the other thread 1002 continues executing instructions (step 1110) until it eventually reaches synchronization point 1012 (step 1112) and executes the store instruction ("ST[MBX]") (step 1114). After storing the value to the mailbox location, thread 1002 continues executing instructions.

Because thread 1000 previously set the load-marking bit 116 for the mailbox location at step 1106, when thread 1002 stores a value to the mailbox the system detects the interfering memory access. This interfering memory access indicates to the system that the second thread has reached synchronization point 1012 (and is therefore synchronized with thread 1000). At this point, the system terminates transactional execution for thread 1000 (step 1116), which causes thread 1000 to resume non-transactional execution at branch target 1010 (step 1118).

Note that neither thread 1000 nor thread 1002 performs any polling during the synchronization process. Instead, thread 1002 intentionally performs an interfering access to a mailbox during transactional execution of thread 1000, which causes thread 1000 to exit transactional execution and resume non-transactional execution from the location indicated by the branch target included in the STE instruction.

Note that although this description is limited to two threads, embodiments with more than two threads are possible. Higher-order multi-threaded embodiments follow the same general principles as a system with two threads. For example, in a system that uses multiple threads, multiple mailboxes can be used to perform synchronization. Furthermore, although the disclosed embodiment involves one thread halting at a synchronization point, in an alternative embodiment both threads halt at their corresponding synchronization point.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for synchronizing threads on a multi-threaded processor, comprising:
   executing instructions from a multi-threaded program using a first thread and a second thread;
   when the first thread reaches a predetermined location in the multi-threaded program, executing a Start-Transactional-Execution (STE) instruction to commence transactional execution, wherein the STE instruction specifies a location to branch to if transactional execution fails;
   during transactional execution of the first thread, accessing a mailbox location in memory which is also accessible by the second thread and then executing instructions that cause the first thread to wait; and
   when the second thread reaches a second predetermined location in the multi-threaded program, signaling the first thread by accessing the mailbox location, which causes the transactional execution of the first thread to fail, thereby causing the first thread to resume non-transactional execution from the location specified in the STE instruction;
   whereby the second thread can signal to the first thread without the first thread having to poll a shared variable.

2. The method of claim 1, wherein commencing transactional execution involves:
   checkpointing the state of the first thread;
   configuring the processor to load-mark cache lines during loads that take place during transactional execution;
   configuring the processor to store-mark cache lines during stores that take place during transactional execution; and
   configuring the processor to continually monitor data references from other threads to detect interfering data references.

3. The method of claim 2, wherein accessing the mailbox location involves storing a value to the mailbox location, or loading a value from the mailbox location.

4. The method of claim 3, wherein signaling the first thread by accessing the mailbox location involves:

storing to the mailbox location wherein the mailbox location was previously load-marked by the first thread, or
loading or a storing to the mailbox location wherein the mailbox location was previously store-marked by the first thread.

5. The method of claim 1, wherein the method further comprises using multiple mailbox locations to extend the method to signaling between three or more threads.

6. The method of claim 1, wherein causing the first thread to wait involves repeatedly executing a delay loop.

7. The method of claim 1, wherein causing the first thread to wait involves causing the first thread to not perform computational operations.

8. An apparatus for synchronizing threads on a multi-threaded processor, comprising:
the processor;
an execution mechanism on the processor, wherein the execution mechanism is configured to execute instructions from a multi-threaded program using a first thread and a second thread;
a mailbox location in a memory, which is accessible by the first thread and the second thread;
when the first thread reaches a predetermined location in the multi-threaded program, the first thread is configured to execute a Start-Transactional-Execution (STE) instruction to commence transactional execution, wherein the STE instruction specifies a location to branch to if transactional execution fails;
during transactional execution, the first thread is configured to access the mailbox location and then to execute instructions that cause the first thread to wait; and
when the second thread reaches a second predetermined location in the multi-threaded program, the second thread is configured to signal the first thread by accessing the mailbox location, which causes the transactional execution of the first thread to fail, wherein the first thread is configured to resume non-transactional execution from the location specified in the STE instruction;
whereby the second thread can signal to the first thread without the first thread having to poll a shared variable.

9. The apparatus of claim 8, wherein when the first thread commences transactional execution, the execution mechanism is configured to:
checkpoint the state of the first thread;
configure the processor to load-mark cache lines during loads that take place during transactional execution;
configure the processor to store-mark cache lines during stores that take place during transactional execution; and
configure the processor to continually monitor data references from other threads to detect interfering data references.

10. The apparatus of claim 9, wherein accessing the mailbox location involves storing a value to the mailbox location, or loading a value from the mailbox location.

11. The apparatus of claim 10, wherein signaling the first thread by accessing the mailbox location involves:
storing to the mailbox location wherein the mailbox location was previously load-marked by the first thread, or
loading or a storing to the mailbox location wherein the mailbox location was previously store-marked by the first thread.

12. The apparatus of claim 8, further comprising at least one additional mailbox location in memory, wherein the execution mechanism is configured to use the additional mailbox location to signal at least one additional thread.

13. The apparatus of claim 8, wherein the first thread is configured to repeatedly execute a delay loop while waiting.

14. The apparatus of claim 8, wherein the first thread is configured not to perform computational operations while waiting.

15. A computer system that synchronizes threads on a multi-threaded processor, comprising:
the processor;
a memory that is coupled to the processor;
an execution mechanism on the processor, wherein the execution mechanism is configured to execute instructions from a multi-threaded program using a first thread and a second thread;
a mailbox location in the memory, which is accessible by the first thread and the second thread;
when the first thread reaches a predetermined location in the multi-threaded program, the first thread is configured to execute a Start-Transactional-Execution (STE) instruction to commence transactional execution, wherein the STE instruction specifies a location to branch to if transactional execution fails;
during transactional execution, the first thread is configured to access the mailbox location and then to execute instructions that cause the first thread to wait; and
when the second thread reaches a second predetermined location in the multi-threaded program, the second thread is configured to signal the first thread by accessing the mailbox location, which causes the transactional execution of the first thread to fail, wherein the first thread is configured to resume non-transactional execution from the location specified in the STE instruction;
whereby the second thread can signal to the first thread without the first thread having to poll a shared variable.

16. The computer system of claim 15, wherein when the first thread commences transactional execution, the execution mechanism is configured to:
checkpoint the state of the first thread;
configure the processor to load-mark cache lines during loads that take place during transactional execution;
configure the processor to store-mark cache lines during stores that take place during transactional execution; and
configure the processor to continually monitor data references from other threads to detect interfering data references.

17. The computer system of claim 16, wherein accessing the mailbox location involves storing a value to the mailbox location, or loading a value from the mailbox location.

18. The computer system of claim 17, wherein signaling the first thread by accessing the mailbox location involves:
storing to the mailbox location wherein the mailbox location was previously load-marked by the first thread, or
loading or a storing to the mailbox location wherein the mailbox location was previously store-marked by the first thread.

19. The computer system of claim 15, further comprising at least one additional mailbox location in memory, wherein the execution mechanism is configured to use the additional mailbox location to signal at least one additional thread.

20. The computer system of claim 15, wherein the first thread is configured to repeatedly execute a delay loop while waiting.

21. The computer system of claim 15, wherein the first thread is configured not to perform computational operations while waiting.

* * * * *